UNITED STATES PATENT OFFICE.

CARLETON ELLIS, OF LARCHMONT, NEW YORK, ASSIGNOR TO ELLIS-FOSTER COMPANY, A CORPORATION OF NEW JERSEY.

SANITARY CALCIMINE.

No. 919,560.        Specification of Letters Patent.        Patented April 27, 1909.

Application filed February 15, 1909. Serial No. 477,996.

*To all whom it may concern:*

Be it known that I, CARLETON ELLIS, citizen of the United States, residing at Larchmont, in the county of Westchester and State of New York, have invented certain new and useful Improvements in Sanitary Calcimines, of which the following is a specification.

This invention relates to calcimine and relates in particular to a composition carrying certain waste sludge material having peculiar hardening and preservative properties.

The usual method of compounding calcimine is to mix powdered glue or casein with a large bulk of chalk, whiting or other similar material. When this is worked up with water to make a cream, and applied to walls, it dries and hardens more or less due to the binding and setting qualities conferred by the glue or casein or other organic binder which may be employed. While the whiting or other filling and extending material is ordinarily very cheap, the organic binder is relatively expensive and hence the amount which may be employed must necessarily be limited to a very moderate quantity in order to meet competitive conditions. So small is the amount of binder ordinarily employed that many calcimines have the disadvantage of chalking, or flaking easily from the wall. This chalky condition leads to the soiling of clothing and other articles which may come in contact with the walls, and other damage. Frequently such calcimined surfaces present an unsightly appearance very soon after application owing to this flaking or disintegrating action. Most calcimines also are very sensitive to moisture and often deteriorate rapidly in damp and foggy weather.

It is the object of my invention to produce a calcimine which can be manufactured at a cost less than or not exceeding that of the calcimines now on the market and to provide a composition which is capable of setting with great hardness to form a smooth, velvety coating possessing brilliancy and depth of color and which is capable of withstanding the effects of moisture and slight mechanical shock without flaking and peeling. I also aim to secure a calcimine having powerful covering properties and yet possessing a certain surface translucency which imparts a finish and effect not obtainable with ordinary calcimines. I further aim to produce a product which if mixed with water and allowed to stand for several days does not become foul, owing to the preservative character of the materials present in the composition. I also aim to provide a composition having disinfectant and antiseptic action so that the walls to which the composition is applied become thereby thoroughly sterilized and disinfected. A further advantage of my improved composition is the freedom with which the material may be spread with a brush, there being not the difficulty from brush marks, laps or irregularities with the present composition owing perhaps to the peculiar state of subdivision of the particles of certain of the components.

The basis of my improved composition is a dried pulverulent waste sludge or similar material, particularly the lime-borax sludge obtained in the manufacture or refining of borax and which contains boracic acid combined either with lime or soda or other bases. I also may employ other waste sludge materials such as those obtained in the manufacture of carbonated waters especially in the process of treating carbonate of lime with sulfuric acid; also the lime sludges obtained in the purification of water for example, where quick-lime or milk of lime is added to waters carrying bi-carbonate of lime and magnesia in the solution; also in the manufacture of caustic alkalies, in which case the form of carbonate of lime carrying a trace of caustic alkalies is especially useful in the preparation of calcimines carrying casein as the binding material. The lime-borax waste however I prefer to use owing to its peculiar preservative properties and to its specific hardening action.

With the sludges I may use various filling and extending materials such as whiting, china clay, ground gypsum, calcined gypsum, barytes, lithopone, zinc oxid, zinc sulfid, marble dust, magnesia, talc and other cheap filling materials. To secure a grain or "tooth" addition of such materials as silex, infusorial earth and the like may be made. Coloring materials such as ocher, umber, Prussian blue, ultra-marine, red oxids, mineral greens, Brunswick green and various lakes and other water insoluble colors or even soluble vegetable or anilin dyes may be employed. Distemper colors i. e. colors which have been ground to a fine state of subdivision in water may be added to secure special shades or tints after the calcimine has been worked into a cream with water. Colors affected by lime as chrome yellow, chrome green, Prussian blue should not be used if the composition contains much lime. Whiting will act upon some green pigments and for green shades Bremen green, ultramarine green or anilin green are preferably employed. Guignet's green also may be used. As a binder preferably I employ glue although casein in conjunction with acid or alkaline bodies, such as carbonate of soda, borax, sodium triphosphate and the like may be employed. Also other binding material such as preparations of Irish moss, gum senegal, gum arabic, starch, soluble starch, dextrin and the like may be used.

In addition to the disinfecting action of the lime-borax waste referred to, I may make use of various other disinfecting and purifying agents, such as zinc sulfate or formate, sodium sulfocarbolate or carbolate, copper salts and the like.

A composition illustrative of my invention consists of lime-borax waste 20 parts, whiting 20 parts, zinc oxid 10 parts and powdered glue 5 parts. The glue should be very finely pulverized and all the materials should be put through a screen of 100 mesh. In using this material, hot water is added to make a thin cream and the mixture then applied to the wall.

Another composition consists of lime-borax waste 25 parts, china clay 25 parts, coloring matter 5 parts, glue 5 parts, alum 1 part.

Still another composition consists of lime-borax waste 20 parts, gilders' whiting 5 parts, lithopone 10 parts, china clay 10 parts, hydrated lime 5 parts, casein 3 parts.

A composition containing an auxiliary disinfecting agent consists of lime-borax waste 20 parts, whiting 20 parts, zinc oxid 5 parts, lithopone 5 parts, tinting materials 2 parts, zinc formate ½ part.

The lime-borax waste which I preferably employ has the composition indicated approximately by the following analysis:—

| | |
|---|---|
| Silica | 8.67% |
| Alumina | 1.81 |
| Iron oxid | .35 |
| Lime | 45.84 |
| Magnesia | 2.75 |
| Anhydrous boracic acid | 2.36 |
| Carbon dioxid | 33.85 |
| Sodium oxid | 1.16 |
| Water | 2.02 |

Small amounts chlorids and sulfates, although considerable variations in the proportions may be made without seriously affecting the hardness of the calcimine after setting, or the preservative, cleansing and disinfecting effect.

To recapitulate: My invention consists in a calcimine, a dried sludge material preferably lime-borax waste, finely divided, and free from coarse particles, in admixture with a binding agent preferably an organic compound such as glue or casein; incorporated with various filling, extending and coloring agents to produce a composition of extremely low cost and having the important feature of setting when applied to plastered or other surfaces, to form a very hard elastic covering which does not chalk or rub off, nor flake under slight mechanical action and which furthermore has a disinfecting and antiseptic action upon the walls and a preservative action on the organic binder, so that decomposition does not occur on exposure to dampness; and with the additional advantage of possessing water-proofing qualities of such degree that the composition as a whole becomes very resistant to atmospheric influences; while the sludge basis imparts to the composition, a luster, brilliancy and a depth of color, opacity and covering power, together with a certain degree of superficial translucency which lends the composition to decorative work and artistic effects of the highest order.

Having described my invention to the details of which description I of course do not desire to limit myself, what I claim as my invention is:—

1. A sanitary calcimine which comprises a dried lime sludge material, a disinfecting body and a binder.

2. A sanitary calcimine which comprises a waste lime sludge, a disinfecting material and an organic binder.

3. A calcimine which comprises lime-borax waste and a binder.

4. A calcimine which comprises lime-borax waste and an organic binder.

5. A calcimine which comprises lime-borax waste and a glue binder.

6. A calcimine which comprises a lime sludge, a disinfecting material, coloring matter and a glue binder.

7. A calcimine which comprises lime-borax waste, extending and coloring material and a binder.

8. A calcimine which comprises lime-borax waste, extending and coloring material and a glue binder.

9. A calcimine comprising lime-borax waste, extending and coloring material a disinfecting body, and a binder.

10. A calcimine comprising lime-borax waste, extending and coloring material, a soluble salt of zinc, and a binder of organic character.

11. A calcimine comprising lime-borax waste, extending and coloring material, zinc formate and a binder of organic character.

12. A calcimine comprising lime-borax waste, whiting, coloring material and a glue binder.

In testimony whereof I have affixed my signature in presence of two witnesses.

CARLETON ELLIS.

Witnesses:
NATHANIEL L. FOSTER,
FRANCES C. NEWMAN.